US009486748B2

United States Patent
Ogura et al.

(10) Patent No.: US 9,486,748 B2
(45) Date of Patent: Nov. 8, 2016

(54) FILTER FOR WATER TREATMENT FILTERING AND METHOD FOR PRODUCING THE SAME

(75) Inventors: Tomoka Ogura, Tokyo (JP); Keiichi Yamakawa, Tokyo (JP)

(73) Assignee: W. L. Gore & Associates, Co., Ltd., Tokyo (JP)

(*) Notice: Subject to any disclaimer, the term of this patent is extended or adjusted under 35 U.S.C. 154(b) by 261 days.

(21) Appl. No.: 14/005,143

(22) PCT Filed: Mar. 14, 2012

(86) PCT No.: PCT/JP2012/056604
§ 371 (c)(1),
(2), (4) Date: Oct. 29, 2013

(87) PCT Pub. No.: WO2012/124745
PCT Pub. Date: Sep. 20, 2012

(65) Prior Publication Data
US 2014/0061122 A1    Mar. 6, 2014

(30) Foreign Application Priority Data

Mar. 14, 2011 (JP) ................. 2011-055854

(51) Int. Cl.
*B01D 39/00* (2006.01)
*B01D 39/14* (2006.01)
(Continued)

(52) U.S. Cl.
CPC ............. *B01D 71/36* (2013.01); *B01D 69/12* (2013.01); *B01D 71/38* (2013.01); *C02F 1/44* (2013.01); *C08J 7/04* (2013.01); *C08J 9/365* (2013.01); *B01D 2323/30* (2013.01); *B01D 2325/30* (2013.01); *B01D 2325/36* (2013.01); *C02F2303/20* (2013.01); *C08J 2327/18* (2013.01); *C08J 2429/04* (2013.01)

(58) Field of Classification Search
CPC ......... B01D 2323/02; B01D 67/0093; B01D 2325/36; B01D 71/36; B01D 2323/30; B01D 69/02; B01D 69/12
See application file for complete search history.

(56) References Cited

U.S. PATENT DOCUMENTS 4,767,645 A     8/1988 Linder et al.
5,130,024 A *   7/1992 Fujimoto et al. ........ 210/500.36
(Continued)

FOREIGN PATENT DOCUMENTS

| JP | 6-1876 A | 1/1994 |
| JP | 8-283447 | 10/1996 |

(Continued)

*Primary Examiner* — Ana Fortuna
(74) *Attorney, Agent, or Firm* — Kilpatrick Townsend & Stockton, LLP

(57) ABSTRACT

The problem to be solved by the present invention is to provide a filter medium for a water treatment filter having contradictory characteristics, that is, hydrophilicity and chemical resistance, and a long life, and to provide the production method thereof. A filter medium for a water treatment filter according to the present invention is characterized in comprising a porous base material having a hydrophilic coating layer; wherein the hydrophilic coating layer has a cross-linked hydrophilic polymer and a high electron density part; a hydrophilic polymer in the cross-linked hydrophilic polymer is cross-linked with an aliphatic saturated hydrocarbon group which may contain one or more functional groups selected from a group consisting of an ether group, a hydroxy group and an amino group; the high electron density part has π electrons; and the high electron density part is covalently bonded to the cross-linked hydrophilic polymer.

15 Claims, 1 Drawing Sheet

(51) Int. Cl.
  *B05D 5/00*    (2006.01)
  *B01D 71/36*   (2006.01)
  *C02F 1/44*    (2006.01)
  *C08J 7/04*    (2006.01)
  *C08J 9/36*    (2006.01)
  *B01D 69/12*   (2006.01)
  *B01D 71/38*   (2006.01)

(56) References Cited

U.S. PATENT DOCUMENTS 5,354,587 A * 10/1994 Abayasekara ............... 428/36.6
5,445,739 A * 8/1995 Fujimoto et al. ............. 210/490
5,614,099 A * 3/1997 Hirose et al. ................ 210/653
2007/0075013 A1* 4/2007 Duong et al. ............ 210/500.36
2009/0191399 A1* 7/2009 Moore et al. ............... 428/319.3
2011/0000846 A1   1/2011 Ishizuka et al.
2014/0061122 A1* 3/2014 Ogura et al. ............ 210/500.37

FOREIGN PATENT DOCUMENTS

| | | |
|---|---|---|
| JP | 11-104470 | 4/1999 |
| JP | 2009-195824 | 9/2009 |
| JP | 2011-11194 | 1/2011 |

* cited by examiner

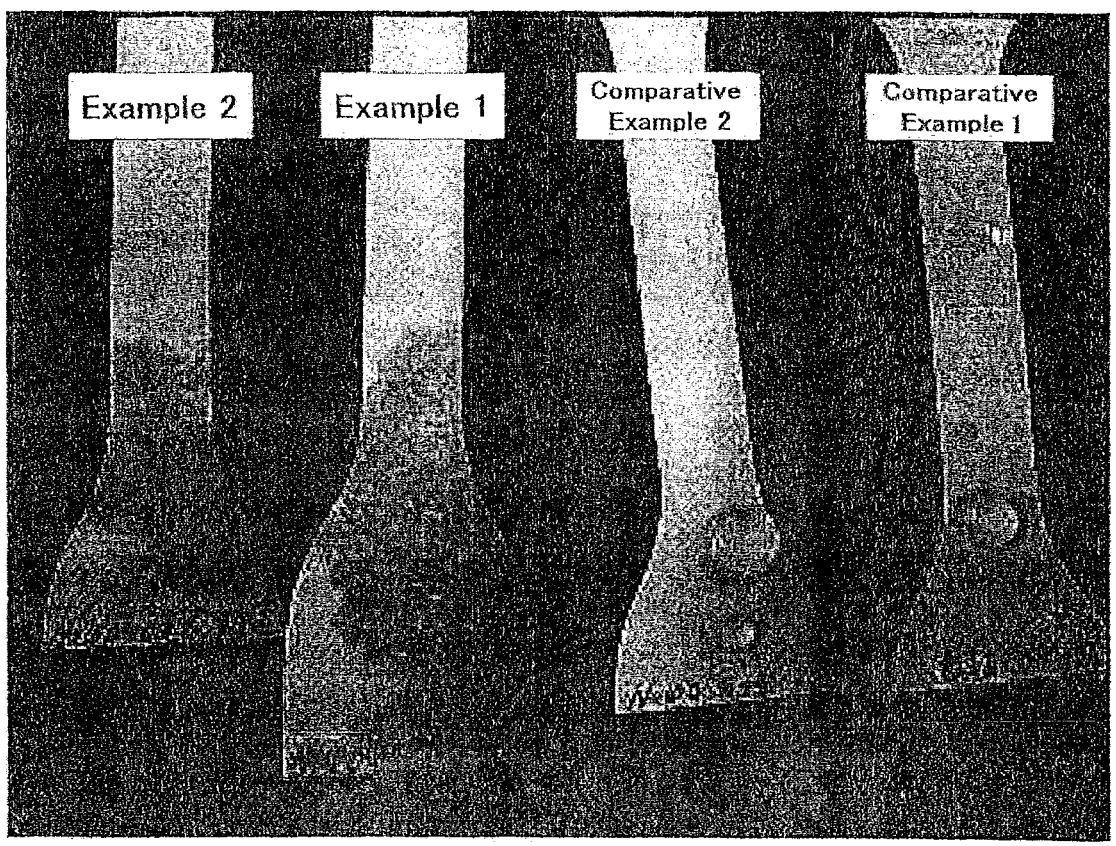

FILTER FOR WATER TREATMENT FILTERING AND METHOD FOR PRODUCING THE SAME

TECHNICAL FIELD

The present invention relates to a filter medium for a water treatment filter, a water treatment filter containing the filter medium, a water treatment device containing the water treatment filter, a method for producing the filter medium and a method for improving oxidation resistance property of the filter medium for a water treatment filter.

BACKGROUND ART

It is important to remove insoluble components in water discharge from an industrial plant, purification treatment of wastewater, use of groundwater and the like. For the removal, a water treatment filter is generally used.

A mixture of microorganism and extra-cellular products, so-called biofouling, adheres to a water treatment filter in addition to that insoluble components are naturally accumulated due to the use of the filter. If these phenomena are neglected, plugging occurs. It is therefore necessary to periodically wash a water treatment filter. However, biofouling is not at all easy to be removed and it is difficult to completely remove biofouling, since biofouling is protection means of microorganism and is sometimes resistant even to certain kinds of chemical substances. Therefore, an oxidizing agent such as hypochlorite is used for washing a water treatment filter.

Hypochlorite is effective against a wide range of microorganism and capable of dissolving and removing biofouling. In addition, hypochlorite also shows an instantaneous effect, a bleaching action, a deodorization function and even more is highly water soluble, economical, relatively low toxic and noncombustible so that hypochlorite has been used widely in food industries and water treatment industrial fields.

Although hypochlorite is widely used for washing a water treatment filter as described above, hypochlorite causes a problem that a filter itself suffers damage and the life of the filter is shortened due to the high effect. Specifically, chlorine in hypochlorite exists in the form of $Cl^+$, which is in extremely electron-poor state as compared with stable chloride ion ($Cl^-$); and therefore, hypochlorite acts as a strong oxidizing agent and attacks the hydrophilic groups and the polymer backbone of a filter material, and sometimes eventually cuts the polymer backbone. It has been therefore studied to employ a material with high chemical resistance as a base material for a filter.

As a raw material excellent in chemical resistance, a fluororesin such as PTFE (polytetrafluoroethylene) can be exemplified. Actually, the fluororesin is utilized as a base material for a water treatment filter; however, there is a disadvantageous point that the fluororesin is inferior in hydrophilicity. Accordingly, technologies for improving the hydrophilicity of a filter made of a fluororesin have been developed.

For example, Patent Document 1 discloses a method of impregnating a porous PTFE membrane with a hydrophilic copolymer of a fluorine-containing vinyl monomer and a vinyl monomer having a hydrophilic group. Patent Documents 2 and 3 disclose methods of coating the surface of a porous PTFE membrane with a hydrophilic polymer such as a cross-linked polyvinyl alcohol.

Further, as a technology for improving the chemical resistance of a filter by surface treatment rather than by material innovation, Patent Document 4 discloses a filter provided with an antioxidant metal layer made of a metal for eliminating active species causing an oxidation action on the surface of a filter base material in order to improve the durability against the active species such as a hydroxy radical.

In addition, as a technology for suppressing the decrease of water permeability due to the repetitions between dry condition and wet condition, Patent Document 5 discloses a porous membrane coated with a cross-linking coating layer in which the cross-linking coating layer contains a blocked isocyanate or a urethane.

PRIOR ART DOCUMENT

Patent Document

Patent Document 1: JP 6-1876 A
Patent Document 2: JP 8-283447 A
Patent Document 3: JP 2011-11194 A
Patent Document 4: JP 2009-195824 A
Patent Document 5: JP 2007-100088 A

SUMMARY OF THE INVENTION

Problems to be Solved by the Invention

As described above, various technologies for improving the chemical resistance and hydrophilicity of a water treatment filter have been developed.

However, hypochlorite to be used for washing a water treatment filter is an extremely strong oxidizing agent, and in the present situation, there is no hydrophilic agent which withstands hypochlorite. Although polyvinyl alcohol can withstand a strong acid and a strong base and is an excellent hydrophilic agent, polyvinyl alcohol is not sufficient in the resistance against hypochlorite and thus the filters of Patent Documents 1 to 3 fail to solve the problem of shortening the life by washing.

In addition, the filter of Patent Document 4 requires a costly metal such as gold, platinum and silver to be supported or deposited on the filter, and therefore not only the production cost becomes high but also the metal drops due to use and the life is similarly thus not so long.

Further, the porous membrane of Patent Document 5 is not sufficient in the resistance against hypochlorite. Specifically, the cross-linking coating layer for coating the porous membrane has a chemical structure that a polyvinyl nucleophilic polymer is cross-linked with a blocked isocyanate or a urethane. Since the urethane group or the isocyanate group in the cross-linking coating layer has the high electron density and shows nucleophilicity, the urethane group or the isocyanate group is easily cut due to the attack of hypochlorite. As a result, there is a problem that a cross-linking coating layer is dropped and hydrophilicity is extremely lowered.

The problem to be solved by the invention is to provide a filter medium for a water treatment filter having contradictory characteristics, that is, hydrophilicity and chemical resistance, and a long life, and to provide the production method thereof.

Means for Solving the Problems

The inventors of the present invention made various investigations for solving the above-mentioned problems.

As a result, the inventors came up with an idea that since hypochlorite to be used for washing a water treatment filter is a strong oxidizing agent and particularly a Cl+ ion in the agent shows extremely high electrophilicity, a porous base material can be effectively protected from hypochlorite by cross-linking a hydrophilic polymer for coating the porous base material with a cross-link group having a relatively lower nucleophilicity, covalently-bonding a high electron density part having π-electrons, which is highly reactive to an electrophile, to a cross-linked hydrophilic polymer and making hypochlorite preferentially attack the part. The inventors experimentally proved the idea; and as a result, finally completed the invention.

A filter medium for a water treatment filter according to the present invention is characterized in comprising a porous base material having a hydrophilic coating layer; wherein the hydrophilic coating layer has a cross-linked hydrophilic polymer and a high electron density part; a hydrophilic polymer in the cross-linked hydrophilic polymer is cross-linked with an aliphatic saturated hydrocarbon group which may contain one or more functional groups selected from a group consisting of an ether group, a hydroxy group and an amino group; the high electron density part has π electrons; and the high electron density part is covalently bonded to the cross-linked hydrophilic polymer.

The high electron density part in the filter medium for a water treatment filter preferably has one or more selected from a group consisting of an aliphatic unsaturated hydrocarbon group, an aromatic hydrocarbon group, a heteroaromatic hydrocarbon group, a carbonyl group, a nitrile group, a sulfoxide bond, a sulfonyl bond and a sulfonic group.

The high electron density part preferably has an amide bond or an aromatic hydrocarbon part.

The high electron density part preferably has further a hydrophilic group. When the high electron density part is an aromatic hydrocarbon group and others, which have highly active π electrons but are not hydrophilic, the hydrophilicity of the filter medium may be decreased though the oxidation durability against hypochlorite is improved. In such a case, the hydrophilicity of the filter medium is maintained by further introducing a hydrophilic group.

As the hydrophilic group, one or more selected from a group consisting of a hydroxy group, a sulfonic group, a carboxy group and an amino group can be exemplified.

As the porous base material, a porous fluororesin membrane can be used, and a porous PTFE membrane is particularly preferable. A high filtration performance is naturally required for the filter medium for a water treatment filter, and in particular, the life for 5 to 10 years is additionally required when a filter is used to treat a large amount of water in a wastewater treatment plant and others. Strength and chemical resistance against an acid or an alkali for a long time are also required for the filter medium for a water treatment filter. In terms of the points, a porous fluororesin membrane, particularly a porous PTFE membrane, is extremely excellent in chemical resistance and can withstand washing treatment with hypochlorite, and further has high strength since a porous PTFE membrane is expanded.

As the hydrophilic polymer, polyvinyl alcohol, ethylene-vinylalcohol copolymer, tetrafluoroethylene-vinylalcohol copolymer, polyalkylene glycol or a metal alkoxide can be exemplified. These hydrophilic polymers can give appropriate hydrophilicity to a porous base material having hydrophobicity. In addition, it becomes difficult that biofouling having many hydrophobic sites adheres on the membrane due to hydrophilicity.

A water treatment filter according to the present invention is characterized in comprising a filter medium for a water treatment filter according to the present invention. The property of the water treatment filter can be exemplified as follows. Water permeability at 20 kPa transmembrane pressure difference is 1 mL/min/cm$^2$ or more. A decreasing rate of water permeability is 70% or less after soaking in a 0.6 mass % sodium hypochlorite aqueous solution for two weeks.

In addition, a water treatment device according to the present invention is characterized in comprising the water treatment filter according to the present invention.

A method for producing a filter medium for a water treatment filter according to the present invention is characterized in comprising the steps of soaking a porous base material in a hydrophilic polymer solution and a cross-linking agent solution, cross-linking a hydrophilic polymer with an aliphatic saturated hydrocarbon group which may contain one or more functional groups selected from a group consisting of an ether group, a hydroxy group and an amino group, and reacting a cross-linked hydrophilic polymer with a precursor compound of a high electron density part having a π electron, to covalently bond the high electron density part to the cross-linked hydrophilic polymer.

A method for improving oxidation resistance property of a filter medium for a water treatment filter according to the present invention is characterized in comprising the step of covalently bonding a high electron density part having a π electron to a porous base material having a hydrophilic coating layer, thereby improving the oxidation resistance property against an oxidizing agent used for washing the water treatment filter, wherein a hydrophilic polymer in a cross-linked hydrophilic polymer is cross-linked with an aliphatic saturated hydrocarbon group which may contain one or more functional groups selected from a group consisting of an ether group, a hydroxy group and an amino group.

Effect of the Invention

In a large scale wastewater treatment plant and others, 5 to 10 years of life is required of the water treatment filter to be used for removing insoluble components. However, since the hydrophilic groups or the cross-linked hydrophilic polymers constituting the hydrophilic coating layer are attacked by a washing treatment with an oxidizing agent such as hypochlorite, the filter itself is deteriorated together with the hydrophilicity thereof and it is actually obliged to exchange the filter at an interval about 1 to 5 years.

On the other hand, since the water treatment filter according to the present invention has a high electron density part more susceptible to the attack by an oxidizing agent such as hypochlorite at different locations from a main chain or a cross-linked chain of a hydrophilic coating layer, the hydrophilic group or the cross-linked hydrophilic polymer is scarcely affected at the time of washing treatment and thus the filter has a long life.

Therefore, the water treatment filter according to the present invention is industrially very useful, since the frequency of exchange and maintenance can be decreased, particularly in large scale water treatment facilities where a large quantity of water has to be treated and exchanged and maintenance of the filter requires a huge cost.

BRIEF DESCRIPTION OF THE DRAWINGS

FIG. 1 is a photograph of the case that water was dropped on a conventional filter medium and the present invention filter medium after the filter medium was treated with sodium hypochlorite.

MODE FOR CARRYING OUT THE INVENTION

A filter medium for a water treatment filter according to the present invention is characterized in comprising a porous base material having a hydrophilic coating layer; wherein the hydrophilic coating layer has a cross-linked hydrophilic polymer and a high electron density part; a hydrophilic polymer in the cross-linked hydrophilic polymer is cross-linked with an aliphatic saturated hydrocarbon group which may contain one or more functional groups selected from a group consisting of an ether group, a hydroxy group and an amino group; the high electron density part has π electrons; and the high electron density part is covalently bonded to the cross-linked hydrophilic polymer.

The water treatment filter according to the present invention contains a porous base material having a hydrophilic coating layer. The porous base material is not particularly limited as long as the material is hydrophilic and porous, and thus usable as a filter for wastewater.

The raw material for the porous base material can be exemplified by, for example, cellulose and derivatives thereof, polyamide, polyacrylonitrile, polyvinyl alcohol and derivatives thereof, poly(meth)acrylic acid and derivatives thereof, which are hydrophilic polymers.

For the porous base material having a hydrophilic coating layer according to the present invention, it is insufficient to have only closed pores and it is necessary to have continuous pores from the front face to the rear face, since the porous base material is used as a filter. The Gurley number standardized in JIS P 8117 of the porous base material is preferably not more than 1000 seconds. The porous base material having the Gurley number of about 1000 seconds or less shows sufficient water permeability and is thus usable as a water treatment filter. The lower limit of the Gurley number is preferably 0.1 second. The Gurley number means the time (second) taken for passing 100 $cm^3$ of air through a sample with an area of 6.45 $cm^2$ in a perpendicular direction under a pressure of 1.29 kPa. In terms of the mass per unit area, 0.5 $g/m^2$ or higher is preferable. If the mass per unit area is not less than 0.5 $g/m^2$, sufficient strength as a filter can be guaranteed. The upper limit of the mass per unit area is preferably 500 $g/m^2$.

The porous base material according to the present invention is coated with the hydrophilic coating layer. The porous base material may be hydrophobic. For example, a porous base material made of a fluororesin or the like with high durability is coated with the hydrophilic coating layer so that the life of a filter can be further prolonged. The fluororesin can be exemplified by, for example, polytetrafluoroethylene (PTFE), polychlorotrifluoroethylene (PCTFE), polyvinylidene fluoride (PVDF), ethylene-tetrafluoroethylene copolymer (ETFE), tetrafluoroethylene-perfluoroalkyl vinyl ether copolymer (PFA), tetrafluoroethylene-hexafluoropropylene copolymer (FEP) and chlorotrifluoroethylene-ethylene copolymer (ECTFE). As the material of the porous base material, an expanded porous polytetrafluoroethylene (ePTFE) is preferable.

The form of the porous base material may be made proper as the desired form of a filter. The thickness thereof may be properly adjusted in accordance with the water pressure at use or the like, and can be generally 15 μm or more and about 1 mm or less. In addition, in the case where a support material such as non-woven fabric is used, the thickness thereof can be 50 μm or more and about 1 mm or less.

The porous base material according to the present invention is coated with the hydrophilic coating layer and the hydrophilic coating layer has a cross-linked hydrophilic polymer and a high electron density part.

The hydrophilic polymer can be exemplified by, for example, polyvinyl alcohol, ethylene-vinyl alcohol copolymer, tetrafluoroethylene-vinyl alcohol copolymer, polyalkylene glycol, and a metal alkoxide such as silicon alkoxide.

In addition, in the case where there is a π electron on the porous base material or the basic structure of the cross-linked hydrophilic polymer, the π electron is attacked by the oxidizing agent and the porous base material or the basic structure of the cross-linked hydrophilic polymer can be broken. Therefore, the porous base material or the basic structure of the hydrophilic polymer preferably has no π electrons. In the present invention, the basic structure means a porous base material or a main chain of a cross-linked hydrophilic polymer and a main chain of a cross-linked chain of a cross-linked hydrophilic polymer. Thus, the high electron density part according to the present invention does not constitute a part of a porous base material or a main chain of a cross-linked hydrophilic polymer and the high electron density part is covalently bonded to a porous base material or a functional group or a branched-chain to which a main chain of a cross-linked hydrophilic polymer is bound. In addition, in the case where a porous base material or a cross-linked hydrophilic polymer has a hydrophilic group, the hydrophilic group is preferably a hydroxy group or an amino group having no π electrons.

The hydrophilic polymer according to the present invention is cross-linked with an aliphatic saturated hydrocarbon group which may contain one or more functional groups selected from a group consisting of an ether group, a hydroxy group and an amino group. In the case where the hydrophilic polymer is cross-linked with only aliphatic saturated hydrocarbon groups, the cross-linked chain is hardly attacked by the oxidizing agent and safely maintained. However, since an ether group, a hydroxy group and an amino group have lone-pair electrons but have no π electrons, these groups have more lower nucleophilicity than that of the high electron density part having a π electron. Therefore, in the case where the filter medium according to the present invention is washed by the oxidizing agent such as hypochlorite, since it is relatively hard that the cross-linked chain is attacked by the oxidizing agent and the hydrophilic coating layer of the present invention is safely maintained, these functional groups are allowed as functional groups of the cross-linked chain.

The length of the cross-linked chain may be appropriately adjusted, and for example, the carbon number of a main chain of an aliphatic saturated hydrocarbon group constituting a cross-linked chain is preferably 2 or more and 15 or less. In the case where the cross-linked chain has a branched structure, the carbon number of a main chain means the carbon number of a straight-chain to which the hydrophilic polymer binds and the carbon number in which the carbon number of a branched site is excluded from the carbon number of an aliphatic saturated hydrocarbon group constituting a cross-linked chain.

In the filter medium for a water treatment filter according to the invention, a high electron density part having π electrons is covalently bonded to the cross-linked hydrophilic polymer constituting the hydrophilic coating layer.

In general, a water treatment filter has to be periodically washed with an oxidizing agent such as hypochlorite to remove biofouling. A conventional water treatment filter is susceptible to damage by the washing treatment, and as a result, the life is shortened. On the other hand, the water treatment filter according to the present invention has a long life, since the present invention filter has durability to the washing treatment with hypochlorite and others.

Specifically, hypochlorite is a strong oxidizing agent and shows electrophilicity, and thus preferentially attacks a higher electron density part. The water treatment filter is generally hydrophilic and shows wettability to water, since the water treatment filter is obtained by using a hydrophilic polymer as a raw material or being coated with a hydrophilic polymer. Such hydrophilicity of a hydrophilic polymer is generally attributed to a large number of hydrophilic groups. However, the hydrophilic groups are attacked by hypochlorite due to the high electron density, and the hydrophilic groups themselves may be decomposed or the basic structure to which the hydrophilic groups are bonded may be broken. In the present invention, a high electron density part having π-electrons which is highly reactive to an electrophilic agent is introduced to a cross-linked hydrophilic polymer of a hydrophilic coating layer for coating a porous base material so that hypochlorite preferentially attacks on the part at the time of washing treatment, and thus the hydrophilic group or the main chain of the cross-linked hydrophilic polymer constituting the hydrophilic coating layer or the cross-linked chain having a specific structure is selectively protected and decomposition and breakage of the hydrophilic groups and basic structures of the cross-linked hydrophilic polymer are suppressed to keep the life of the filter.

The high electron density part having π-electrons may have, for example, one or more selected from a group consisting of an aliphatic unsaturated hydrocarbon group, an aromatic hydrocarbon group, a heteroaromatic hydrocarbon group, a carbonyl group, a nitrile group, a sulfoxide bond, a sulfonyl bond and a sulfonic group.

The aliphatic unsaturated hydrocarbon group can be exemplified by a monovalent or divalent $C_{2-6}$ aliphatic unsaturated hydrocarbon group having one or more double bonds and/or triple bonds. The example thereof can include a $C_{2-6}$ alkenyl group such as a vinyl group, an allyl group, a 2-methyl-1-propenyl group, a 2-methyl-2-propenyl group, a butenyl group, a 1-methyl-2-butenyl group, a 1-methyl-1-butenyl group, a 3-methyl-2-butenyl group, a 1-methyl-3-butenyl group, a 2-methyl-3-butenyl group, a pentenyl group and a hexenyl group; a monovalent $C_{2-6}$ alkynyl group such as an ethynyl group, a propynyl group, a 1-methyl-2-propynyl group, a 2-methyl-2-propynyl group, a butynyl group, a 1-methyl-2-butynyl group, a 2-methyl-2-butynyl group, a 1-methyl-3-butynyl group, a 2-methyl-3-butynyl group, a pentynyl group, a 1-methyl-2-pentynyl group, a 2-methyl-2-pentynyl group, a 1-methyl-3-pentynyl group, a 2-methyl-3-pentynyl group, a 1-methyl-4-pentynyl group, a 2-methyl-4-pentynyl group and a hexynyl group; and a divalent unsaturated hydrocarbon group such as —CH=CH— and —C≡C—. In the present application, the group having one bond number with other part is referred to as monovalent group and the group having two bond numbers with other parts is referred to as divalent group.

The aromatic hydrocarbon group can be exemplified by a monovalent $C_{6-12}$ aromatic hydrocarbon group and a divalent $C_{6-12}$ aromatic hydrocarbon group. The example thereof can include a monovalent $C_{6-12}$ aromatic hydrocarbon group such as a phenyl group, an indenyl group, a naphthyl group and a biphenyl group; and a divalent $C_{6-12}$ aromatic hydrocarbon group such as a phenylene group, a naphthylene group and a biphenylene group.

The heteroaromatic hydrocarbon group can be exemplified by a five-membered heteroaryl group, a six-membered heteroaryl group, a condensed heteroaryl group, a five-membered heteroarylene group, a six-membered heteroarylene group and a condensed heteroarylene group, which contain one or more heteroatoms selected from a nitrogen atom, an oxygen atom and a sulfur atom. The example thereof can include a monovalent five-membered heteroaryl group such as a pyrrolyl group, an imidazolyl group, a pyrazolyl group, a thienyl group, a furyl group, an oxazolyl group, an isoxazolyl group, a thiazolyl group, an isothiazolyl group and a thiadiazole group; a monovalent six-membered heteroaryl group such as a pyridinyl group, a pyrazinyl group, a pyrimidinyl group and a pyridazinyl group; a monovalent condensed heteroaryl group such as an indolidinyl group, an indolyl group, an isoindolyl group, an indazolyl group, a quinolyl group, an isoquinolyl group, a chromenyl group, a benzoxazolyl group and a benzothiazolyl group; and a divalent heteroarylene group corresponding to the above groups.

The above-mentioned aliphatic unsaturated hydrocarbon group, aromatic hydrocarbon group and heteroaromatic hydrocarbon group may have a general substituent group.

A carbonyl group may be contained in other functional group. The functional group containing a carbonyl group can be exemplified by, for example, a carbamoyl group, a carboxy group, a formyl group, a $C_{2-7}$ acyl group, a $C_{2-7}$ alkoxycarbonyl group, a urea group, an acrylate group, a methacrylate group, an amide bond and a urethane bond. Among the groups, a carbamoyl group, a carboxy group, a $C_{2-7}$ alkoxycarbonyl group, an amido bond and a urethane bond are more preferable, since the groups have a higher electron density than that of a carbonyl group itself and are easy to be attacked by hypochlorite and the like. When the hydrophilic group of the hydrophilic polymer is a hydroxy group and an isocyanate compound is reacted with the group, the reaction part forms a urethane bond. The ether oxygen atom (—O—) in the urethane bond is derived from a hydroxy group of the hydrophilic polymer, and therefore, the "group having π-electrons" here means an amido group.

The high electron density part is preferably A group, more preferably B group, and even more preferably C group as follows.

A group: the part containing a nitrogen atom, an oxygen atom or a sulfur atom having lone-pair electrons in addition to π-electrons B group: the part having π-electrons neighboring to a nitrogen atom, an oxygen atom or a sulfur atom having lone-pair electrons C group: the part having mutually conjugated two or more π-electrons in addition to a nitrogen atom, an oxygen atom or a sulfur atom having lone-pair electrons neighboring to the conjugated π-electrons The kind of the high electron density part may be selected properly in accordance with the kind of a porous base material and the hydrophilic polymer contained in the hydrophilic coating layer. In the case that the hydrophilic polymer contained in the hydrophilic coating layer is polyvinyl alcohol or polyvinyl alcohol copolymer, it is experimentally proved that a carbonyl group is preferable as a group having π-electrons in the high electron density part.

The group having π-electrons in the high electron density part is preferably a group having a highly active π electron. For example, since the aromatic hydrocarbon group or the heteroaromatic hydrocarbon group has 4n+2 of π electrons, wherein n is integer of 0 or more, and two or more double bonds are conjugated, π electrons contained in these groups are very highly active. Therefore, the aromatic hydrocarbon group or heteroaromatic hydrocarbon group in the high electron density part is preferentially and easily attacked by hypochlorite so that the porous base material or the hydrophilic groups and basic structure of the hydrophilic polymer can be effectively protected.

The case that "the high electron density part is covalently bonded to the cross-linked hydrophilic polymer" may include cases that the high electron density part, more specifically a group or a bond having π-electrons, may be covalently bonded to the cross-linked hydrophilic polymer contained in the hydrophilic coating layer in a manner of directly bonding or indirectly bonding thereto through a linker group; and that a compound containing a group or a bond having π-electrons may be covalently bonded. In addition, the high electron density part according to the present invention does not constitute a part of a porous base material or a main chain of a cross-linked hydrophilic polymer, and is covalently bonded to a porous base material or a functional group or a branched chain which is bonded to a main chain of a cross-linked hydrophilic polymer. Further, in the case where the porous base material or the cross-linked hydrophilic polymer has the hydrophilic group, the hydrophilic group is preferably a hydroxy group or an amino group having no a π electron.

The high electron density part preferably further has a hydrophilic group. In the case where a group or a bond having π-electrons of the high electron density part hydrophobic part such as the aromatic hydrocarbon and such a high electron density part is bonded to the hydrophilic group of the cross-linked hydrophilic polymer, the hydrophilicity of the whole filter medium according to the present invention may be lowered. In such a case, when the high electron density part has a hydrophilic group, the hydrophilicity of the filter medium can be maintained.

The filter medium for a water treatment filter according to the present invention can be produced by a method comprising the steps of soaking a porous base material in a hydrophilic polymer solution and a cross-linking agent solution, cross-linking a hydrophilic polymer with an aliphatic saturated hydrocarbon group which may contain one or more functional groups selected from a group consisting of an ether group, a hydroxy group and an amino group, and reacting a precursor compound of a high electron density part having a π electron with a cross-linked hydrophilic polymer, to covalently bond the high electron density part to the cross-linked hydrophilic polymer. Each step of the method of the present invention is exemplified as follows.

(1) Soaking Step

First, a porous base material is soaked in a hydrophilic polymer solution and a cross-linking agent solution.

If necessary, the porous base material may be previously wetted in a solvent of the hydrophilic polymer solution or the cross-linking agent solution. For example, in the case where a solvent of the hydrophilic polymer solution or the cross-linking agent solution is water or alcohol and the base material of the porous base material is a fluororesin having hydrophobicity, the porous base material cannot be sufficiently coated in some cases. In such a case, the porous base material can be sufficiently coated by previously wetting in the solvent. For example, in the case where the porous base material is previously wetted in water, the porous base material may be first wetted in alcohol such as ethanol, and in turn may be wetted in water.

The order for soaking the porous base material in the hydrophilic polymer solution and the cross-linking agent solution is optional. For example, it is preferable that the porous base material is first soaked in the hydrophilic polymer solution since the main component of the hydrophilic coating layer is the hydrophilic polymer.

The solvent of the hydrophilic polymer solution is preferably water, water-soluble organic solvent, and the mixture of water and water-soluble organic solvent due to hydrophilicity of the polymer. Examples of water-soluble organic solvent can include alcohol solvents such as methanol and ethanol; ether solvents such as diethyl ether and tetrahydrofuran; ketone solvents such as acetone; and amide solvents such as dimethylformamide and dimethylacetamide.

The concentration of the hydrophilic polymer solution may be appropriately adjusted, and for example, the concentration thereof can be 0.1 mass % or more and 10 mass % or less.

The cross-linking agent is not particularly limited as long as the cross-linking agent has one or more selected from a group consisting of an ether group, a hydroxy group and an amino group in a functional group remaining on the cross-linked chain after reactions or the cross-linking agent has no remaining functional groups. For example, a diepoxy compound such as ethylene glycol diglycidyl ether, (poly)ethylene glycol diglycidyl ether, (poly)propylene glycol diglycidyl ether, propylene glycol diglycidyl ether, diglycerol triglycidyl ether, tetraglycerol tetraglycidyl ether, and poly(ethyleneglycol)diglycidyl ether: a dialdehyde compound such as glyoxal, malondialdehyde, succinicdialdehyde, glutaraldehyde, hexane dial, heptane dial, octane dial, nonane dial, and decane dial; a silicon alkoxide compound such as tetramethoxysilane, tetraethoxysilane, tetraisopropoxysilane, tetrabutoxysilane, methyltrimethoxysilane, methyltriethoxysilane, dimethyldiethoxysilane, dimethyldimethoxysilane, and tetrapropoxysilane; a vinyl compound such as vinyl chloride, vinylidene chloride, methyl vinyl ether, ethyl vinyl ether, propyl vinyl ether, n-butyl vinyl ether, t-butyl vinyl ether, 2-ethylhexyl vinyl ether, cyclohexylvinyl ether, methoxyethyl vinyl ether, methoxyethoxyethyl vinyl ether, and tetrahydro furfuryl vinyl ether; an allylic compound such as ethylene glycol monoallyl ether, trimethylolpropane allyl ether, diethylene glycolmonoallylether, pentaerythritol triallyl ether, and glycerol monoallyl ether; and an alkene compound such as ethylene, propylene, and isobutylene can be used. In the present invention, the cross-linking agents such as those containing a π electron remaining on the cross-linked chain after cross-linked reactions cannot be used.

As the solvent of the cross-linking agent solution, the same solvents as the solvents of the hydrophilic polymer solution can be used.

The concentration of the cross-linking agent solution may be appropriately adjusted, and for example, the concentration thereof can be 0.1 mass % or more and 10 mass % or less.

For accelerating reactions, a base or an acid may added to one or both of the hydrophilic polymer solution and the cross-linking agent solution. Examples of such a base include an alkali metal hydroxide such as sodium hydroxide or potassium hydroxide. Examples of such an acid include hydrochloric acid.

In this step, after the porous base material is soaked in one of the hydrophilic polymer solution and the cross-linking agent solution, the porous base material is soaked in the other solution. These soaking treatments may consecutively carried out. Alternatively, the porous base material may be soaked in one of the hydrophilic polymer solution and the cross-linking agent solution, the solution on the porous base material may be dried to some extent, and the porous base material may be soaked in the other solution.

(2) Cross-Linking Step

Next, a hydrophilic polymer is cross-linked with the porous base material by means in accordance with a used cross-linking agent, to form a solid hydrophilic coating layer comprising the cross-linked hydrophilic polymer on the porous base material.

For example, in the case where a diepoxy compound, a dialdehyde compound and the like are used as the cross-linking agent, the heating treatment may be carried out.

The condition of the heating treatment may be appropriately adjusted as long as the hydrophilic polymer is sufficiently cross-linked. For example, the temperature of the heating treatment can be 90° C. or more and 200° C. or less. The time of the heating treatment can be 5 minutes or more and 10 hours or less.

For example, in the case where the hydrophilic polymer has a hydroxy group as the hydrophilic group and the diepoxy compound is used as the cross-linking agent, an ether group (—O—) and a hydroxy group are contained in the cross-linked chain. In the case where the hydrophilic polymer has an amino group as the hydrophilic group and the diepoxy compound is used as the cross-linking agent, an amino group (—NH—) and a hydroxy group are contained in the cross-linked chain. In the case where the hydrophilic polymer has a hydroxy group as the hydrophilic group and the dialdehyde compound is used as the cross-linking agent, an ether group is contained in the cross-linked chain.

However, in the case where the hydrophilic polymer has an amino group as the hydrophilic group and the dialdehyde compound is used as the cross-linking agent, an imino group (—N=C<) containing a π electron is formed. In such a case, it is preferable that an imino group is reduced into an amino group (—NH—) by the action of the reducing agent.

In the case where the silicon alkoxide compound is used as the cross-linking agent, the hydrophilic polymer can be polymerized together the polymerization of a silicon alkoxide by the addition of boron ion and halogen ion as a catalyst and the adjustment of pH of 8 or more and 10 or less.

In the case where the alkene compound and the like are used as the cross-linking agent, the functional group on the main chain of the hydrophilic polymer or the main chain itself can be cross-linked by occurrence of radical with radiation of an ultraviolet. As an ultraviolet, a light of wavelength of 10 nm or more and 400 nm or more can be used.

(3) High Electron Density Part Bonding Step

Further, the precursor compound of the high electron density part having a π electron is reacted with the hydrophilically coated porous base material, to covalently bond the high electron density part to a cross-linked hydrophilic polymer.

The precursor compound of the high electron density part is a compound for covalently bonding the group or bond which has π-electrons to the cross-linked hydrophilic polymer and a compound having a group reactive to the hydrophilic group and basic structure of the hydrophilic polymer in addition to the group or bond which has π-electrons and forming the reaction site which is the group having π-electrons. As an example of the latter compound, when an isocyanate compound is reacted on a hydroxy group of the hydrophilic polymer, the reaction site becomes a urethane bond having —O— and —NH(C=O)—. In this case, since —O— is derived from a hydroxy group of the hydrophilic polymer, the amido bond is regarded as the bond having π-electrons in the present invention.

The reactive group for forming the covalent bond to the hydroxy group can be exemplified by, for example, an isocyanate group; an isothiocyanate group; an acid halide group such as acid chloride and acid bromide; an active imide such as succinimide, phthalic imide, N-hydroxysuccinimide and 5-norbornene-2,3-dicarboximide; an active ester such as p-nitrophenyl ester; and an aldehyde group.

The number of the reactive group in the precursor compound of the high electron density part may be 2 or more. In this case, when the porous base material has the reactive functional group, the porous base material itself or the hydrophilic polymer constituting the hydrophilic coating layer may be cross-linked so that the strength and durability of the filter may be possibly improved further.

The number of the high electron density part per one molecule of the precursor compound of the high electron density part may also be 2 or more. When the high electron density part is covalently bonded to the hydrophilic polymer through the hydrophilic group of the hydrophilic polymer and there are 2 or more high electron density parts for the hydrophilic group, the remaining hydrophilic group can be efficiently protected, and therefore, deterioration of the hydrophilicity of the filter can be suppressed even through a washing with hypochlorite.

More specific reaction condition may be determined properly in accordance with the type of the reactive group of the precursor compound of the high electron density part and the like. For example, when the main hydrophilic group of the hydrophilic polymer is a hydroxy group and the reactive group of the precursor compound of the high electron density part is an active ester group, the precursor compound may be dissolved in a solvent having a proper solubility and then the hydrophilically coated porous base material may be impregnated with the solution or the solution may be applied to the hydrophilically coated porous base material and successively the porous base material is heated if necessary to form a covalent bond of the high electron density part to the hydrophilic polymer of the hydrophilic coating layer and introduce the high electron density part. When the main hydrophilic group of the hydrophilic polymer of the hydrophilic coating layer is a hydroxy group and the reactive group of the precursor compound of the high electron density part is an aldehyde group, it is preferable to add a proper acid catalyst to the solution.

The filter medium for a water treatment filter according to the present invention has to be permeable to wastewater to be treated. If the concentration of the precursor compound of the high electron density part is too high at the time of the reaction, the continuous pores of the porous base material may possibly be plugged. The proper concentration of the precursor compound of the high electron density part in the reaction solution depends on the porosity of the porous base material and the type of the compound for improving the durability and the like; and the concentration is, in general, preferably not less than 0.01 mass % and not more than 5 mass %. The concentration is more preferably not less than 0.02 mass %, even more preferably not less than 0.05 mass %, particularly preferably not less than 0.1 mass %, and more preferably not more than 3 mass %, even more preferably not more than 2 mass %, and particularly preferably not more than 1 mass %.

The heating temperature and heating time after the above-mentioned impregnation or application of the solution may be determined property based on preliminary experiment or the like, and for example, heating treatment may be carried out at not less than about 100° C. and not more than about 250° C. for not less than about 10 minutes and not more than about 5 hours.

The filter medium for the water treatment filter of the present invention is made to be a water treatment filter by a common method. For example, the filter medium may be cut into a form corresponding to a water treatment apparatus for which the filter is to be employed after being processed, or may be formed previously into a desired form and then processed. The processing is not particularly limited and can be exemplified by pleating processing, processing for cylindrical forming, processing for spiral forming, lamination and adhesion to frames.

The filter medium for a water treatment filter according to the present invention is excellent in water permeability. For example, water permeability at 20 kPa transmembrane pressure difference is 1 mL/min/cm$^2$ or more.

In addition, the filter medium for a water treatment filter according to the present invention shows high resistance against the oxidizing agent such as hypochlorite to be used for washing a water treatment filter. For example, a decreasing rate of water permeability is preferably 70% or less after soaking in a 0.6 mass % sodium hypochlorite aqueous solution for two weeks. The decreasing rate of water permeability is more preferably 65% or less, even more preferably 60% or less, even more preferably 55% or less, even more preferably 50% or less, even more preferably 40% or less, and particularly preferably 30% or less. The decreasing rate of water permeability is calculated with the following formula. A decreasing rate of water permeability by the oxidizing agent (%)=[1−(water permeability at 20 kPa transmembrane pressure difference after soaking in a 0.6 mass % sodium hypochlorite aqueous solution for two weeks)/(water permeability at 20 kPa transmembrane pressure difference before soaking)]×100

It is also possible to produce a water treatment apparatus using the filter of the present invention. For example, a porous material for forming flow channels may be arranged in both faces of the filter of the present invention which is pleated, and the resulting filter may be put in a cylindrical case, and both ends are sealed to give a cartridge filter. Alternatively, a porous material for forming flow channels may be arranged similarly in both faces of the filter of the invention and both sides and one end in the longitudinal direction are sealed so as to form an envelope-like shape, and the resulting body is rolled around a core material for forming a flow channel to give a spiral type filter.

The water treatment filter and the water treatment apparatus according to the present invention are useful for filtering water and a solution containing an aqueous organic solvent, since the filter medium itself is hydrophilic. For example, the water treatment filter and the water treatment apparatus can be applied for filtering a solution and a suspension containing a chemical agent or protein, clean water, industrial wastewater, sewage and filthy water, beverages such as juice and others.

The filter medium of the present invention is sufficiently durable to washing with an oxidizing agent such as hypochlorite. The filter medium is therefore particularly useful for especially large scale filtration of wastewater and sewage.

As described above, a conventional filter medium for a water treatment filter is not sufficient in the oxidation resistance to an oxidizing agent used for removing biofouling or the like, and the life thereof is shortened by washing. On the other hand, in the present invention, a high electron density part containing π-electrons having remarkably high reactivity on an oxidizing agent is covalently bonded to a hydrophilic porous basic material in order to make the oxidizing agent preferentially attack the π-electron part in the hydrophilic porous base material; and as a result, the hydrophilic porous base material can be protected from the oxidizing agent. Further, since the π-electron part is covalently bonded, the part scarcely drops off unlike the case that an oxidation resistance agent is supported.

Consequently, according to the present invention, it becomes possible to improve the oxidation resistance of a filter medium for a water treatment filter against an oxidizing agent to be used for washing and prolong the life of the water treatment filter.

The present application claims the benefit of priority to Japanese Patent Application Number 2011-055854 filed on Mar. 14, 2011. The entire contents of the specification of Japanese Patent Application Number 2011-055854 filed on Mar. 14, 2011 are hereby incorporated by reference.

EXAMPLES

Hereinafter, the present invention is explained in more detail by examples; however, the present invention is not limited by the examples, and the examples can be carried out with appropriate modification in the range met with the content of the present application disclosure, and both of the examples and such a modification are included in the technical range of the present invention.

Hereinafter, "%" represents "mass %", unless otherwise defined.

Example 1

(1) Production of a Hydrophilic Expanded Polytetrafluoroethylene Porous Membrane A microporous polytetrafluoroethylene membrane (product name: SM9-54020 manufactured by Japan Gore-Tex Inc.; pore diameter: 0.2 µm; thickness: 200 µm; layered product with polyester non-woven fabric) was impregnated with ethanol in advance, and the ethanol was substituted for pure water. Then, the membrane was impregnated with a 1.0 mass % polyvinyl alcohol aqueous solution (product name: PVA-107 manufactured by KURARAY Co., Ltd.). Subsequently, ethylene glycol diglycidyl ether as a cross-linking agent was added to a 0.2% potassium hydroxide aqueous solution to obtain a 2.0 mass % solution, and the above membrane was impregnated with the solution. Anneal treatment was carried out under atmospheric pressure at 150° C. for 10 minutes. Then, the membrane was washed by immersing in boiled water for 30 minutes and subsequently dried, to obtain a hydrophilic expanded polytetrafluoroethylene porous membrane (hereinafter, referred to as "hydrophilic ePTFE membrane").

(2) Production of Filter Medium According to the Present Invention

To a commercially available 35% hydrophilic blocked isocyanate aqueous solution (product name: Bayhydur® BL5335 manufactured by Bayer MaterialScience AG; hereinafter, abbreviated to as "BL5335") (0.086 g), water was added so that the total amount became 30 g, to obtain a 0.1% aqueous solution. The aqueous solution was applied on the above hydrophilic ePTFE membrane in a thin layer and excess solution was removed using a barcoater (manufactured by DAIICHIRIKA). Then, the membrane was heated at 170° C. for 30 minutes so that the terminal isocyanate group of BL5335 was reacted with the hydroxy group of polyvinyl alcohol, to obtain a filter medium.

The basic structure of BL5335 has been announced as the following structure. The detailed chemical structure has not been opened; but it was found by the measurement with XRF and IR that the compound had a hydroxy group as a major hydrophilic group.

[Chemical Formula 1]

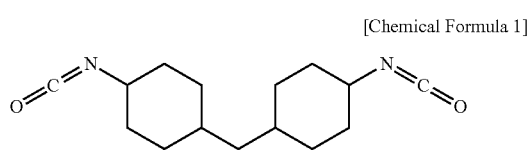 [SMILES: O=C=NC1CCC(CC2CCC(N=C=O)CC2)CC1]

In the above described reaction, —O—C(=O)—NH— group including π-electrons was formed by reacting the terminal isocyanate group of BL5335 with the hydroxy group of polyvinyl alcohol.

Example 2

A filter medium was prepared according to a similar method to the above Example 1 except that 0.429 g of BL5335 was used and the solution concentration was adjusted to 0.5%.

Example 3

A filter medium was prepared according to a similar method to the above Example 1 except that 0.696 g of BL5335 was used and the solution concentration was adjusted to 0.8%.

Example 4

A filter medium was prepared according to a similar method to the above Example 1 except that 0.858 g of BL5335 was used and the solution concentration was adjusted to 1%.

Example 5

A filter medium was prepared according to a similar method to the above Example 1 except that 1.716 g of BL5335 was used and the solution concentration was adjusted to 2%.

Example 6

A filter medium was prepared according to a similar method to the above Example 1 except that 2.574 g of BL5335 was used and the solution concentration was adjusted to 3%.

Example 7

To a commercially available 30% blocked isocyanate aqueous solution (product name: MEIKANATE MF manufactured by Meisei Chemical Works, Ltd.) (0.15 g), water was added so that the total amount became 30 g, to obtain a 0.15% aqueous solution. The aqueous solution was applied on the hydrophilic ePTFE membrane similarly to the above Example 1, and then the membrane was heated at 160° C. for 5 minutes, to obtain a filter medium.

The chemical structure of MEIKANATE is as follows, and —O—C(=O)—NH— group including π-electrons was formed by reacting the terminal isocyanate group with the hydroxy group of polyvinyl alcohol. In addition, benzene ring has also π-electrons.

[Chemical Formula 2]

Example 8

To a commercially available 39% hydrophilic blocked isocyanate aqueous solution (product name: Bayhydur® BL-XP-2669 manufactured by Bayer MaterialScience AG; hereinafter, abbreviated to as "XP2669") (0.389 g), water was added so that the total amount became 30 g, to obtain a 0.5% aqueous solution. The aqueous solution was applied on the hydrophilic ePTFE membrane similarly to the above Example 1, and then the membrane was heated at 80° C. for 5 minutes, to obtain a filter medium.

The basic structure of XP2669 is as follows, and hydrophilic group is introduced in the basic structure. In the above described reaction, —O—C(=O)—NH— group including π-electrons was formed by reacting the terminal isocyanate group of XP2669 with the hydroxy group of polyvinyl alcohol.

[Chemical Formula 3]

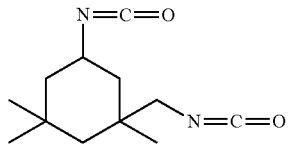

Comparative Example 1

The hydrophilic ePTFE membrane obtained in the above Example 1(1) was used as it was.

Comparative Example 2

The hydrophilic ePTFE membrane obtained in the above Example 1(1) was heated at 170° C. for 30 minutes, and the heated membrane was used.

Test Example 1

Wettability Test

A drop of water (about 0.1 mL) was added dropwise using a dropper on the filter media of the above Examples 1 to 8 and Comparative Examples 1 and 2 from heights of 10 cm, and wettability was evaluated on the following basis.

5: a water drop permeated into a filter medium within 1 second;

4: a water drop permeated into a filter medium over 1 second and within 1 minute;

3: a water drop permeated into a filter medium over 1 minute and within 3 minutes;

2: a water drop did not permeate into a filter medium within 3 minutes and the filter medium slightly got wet;

1: a water drop did not permeate into a filter medium at all and the filter medium did not get wet.

In addition, each filter medium was soaked in a 0.6 mass % sodium hypochlorite aqueous solution for 2 weeks, and then washed with water and dried at room temperature overnight. Subsequently, wettability was examined by similar condition as the above. The results are shown in Table 1. In addition, the photograph of the case that water was dropped on the filter media of Examples 1 to 2 and Comparative Examples 1 to 2 after Soaking in the sodium hypochlorite aqueous solution is shown in FIG. 1.

TABLE 1

|  |  | Before NaClO treatment | After NaClO treatment |
|---|---|---|---|
| Comparative Example 1 | Untreated hydrophilic ePTFE membrane | 5 | 1 |
| Comparative Example 2 | Heat-treated hydrophilic ePTFE membrane | 5 | 1 |
| Example 1 | Hydrophilic ePTFE membrane treated by 0.1% BL5335 | 5 | 5 |
| Example 2 | Hydrophilic ePTFE membrane treated by 0.5% BL5335 | 5 | 5 |
| Example 3 | Hydrophilic ePTFE membrane treated by 0.8% BL5335 | 4 | 4 |
| Example 4 | Hydrophilic ePTFE membrane treated by 1% BL5335 | 4 | 4 |
| Example 5 | Hydrophilic ePTFE membrane treated by 2% BL5335 | 3 | 3 |
| Example 6 | Hydrophilic ePTFE membrane treated by 3% BL5335 | 2 | 2 |
| Example 7 | Hydrophilic ePTFE membrane treated by 0.15% MEIKANATE | 2 | 2 |
| Example 8 | Hydrophilic ePTFE membrane treated by 0.5% XP2669 | 5 | 5 |

As shown in the results in Table 1 and FIG. 1, the hydrophilicity of the untreated hydrophilic ePTFE membrane (Comparative Example 1) and of the hydrophilic ePTFE membrane that was only heat-treated (Comparative Example 2) was decreased after the membranes were soaked in the sodium hypochlorite aqueous solution for 2 weeks. The cause is thought to be that the number of hydroxyl groups of PVA coating porous PTFE was decreased and the basic structure of PVA was broken due to sodium hypochlorite so that the hydrophilicity of the membranes was decreased. When such a membrane is repeatedly washed using hypochlorite at regular intervals, differential pressure will be raised and flow rate will become decreased.

On the other hand, the hydrophilicity of the filter media according to the present invention was hardly decreased regardless of the treatment using hypochlorite. The reason is thought to be due to the fact that an amide group having π-electrons and high electron density is preferentially attacked by hypochlorite, and as a result, PVA is protected from the attack of hypochlorite and the hydrophilicity can be maintained.

By the above experiment, it was demonstrated that when a filter medium of the present invention is applied to a water treatment filter for waste water treatment and the like, the performance of the filter medium is difficult to be lowered and the life thereof is longer than that of a conventional filter medium even when the filter medium is efficiently washed using hypochlorite.

In the above experiment, a drop of water was added dropwise for examining the degree of deterioration of hydrophilicity; however, a large amount of water is introduced to a filter in actual water treatment, and therefore the level of the above "2" is sufficient as the hydrophilicity of a filter medium for a water treatment filter.

Example 9

A filter medium according to the present invention was prepared according to a similar method to the above Example 1 except that a microporous polytetrafluoroethylene membrane having 0.5 μm of pore diameter (product name: SM9-54050 manufactured by Japan Gore-Tex Inc.; thickness: 200 μm; layered product with polyester non-woven fabric) was used in place of a microporous polytetrafluoroethylene membrane having 0.2 μm of pore diameter.

Example 10

A filter medium according to the present invention was prepared according to a similar method to the above Example 2 except that a microporous polytetrafluoroethylene membrane having 0.5 μm of pore diameter (product name: SM9-54050 manufactured by Japan Gore-Tex Inc.; thickness: 200 μm; layered product with polyester non-woven fabric) was used in place of a microporous polytetrafluoroethylene membrane having 0.2 μm of pore diameter.

Example 11

A filter medium according to the present invent: on was prepared according to a similar method to the above Example 7 except that a microporous polytetrafluoroethylene membrane having 0.5 μm of pore diameter (product name: SM9-54050 manufactured by Japan Gore-Tex Inc.; thickness: 200 μm; layered product with polyester non-woven fabric) was used in place of a microporous polytetrafluoroethylene membrane having 0.2 μm of pore diameter.

Comparative Example 3

Polyvinyl alcohol (product name: PVA-107 manufactured by KURARAY Co., Ltd.; 1 g) and water (49 g) were placed in a 250 mL Erlenmeyer flask. The mixture was stirred at about 90° C., to dissolve polyvinyl alcohol. After the solution was cooled to room temperature, isopropyl alcohol (about 45 g) and a commercially available 30% blocked isocyanate aqueous solution (product name: MEIKANATE MF manufactured by Meisel Chemical Works, Ltd.; an amount equivalent to 0.05 g of blocked isocyanate) were added thereto with severely stirring. The solution was sprayed to a microporous polytetrafluoroethylene membrane (product name: SM9-54050 manufactured by Japan Gore-Tex Inc.; pore diameter: 0.5 μm; thickness: 200 μm; layered product with polyester non-woven fabric), and the sprayed membrane was completely soaked in the solution. The membrane was heated at 160° C. for 5 minutes, and then heated at 110° C. for 2 hours, to obtain a filter medium coated with a hydrophilic polymer in which polyvinyl alcohol was cross-linked with a diisocyanate compound.

Comparative Example 4

A filter medium coated with a hydrophilic polymer in which polyvinyl alcohol was cross-linked with a diisocyanate compound was prepared according to a similar method to Comparative Example 3 except that an amount of blocked isocyanate used was 0.1 g.

Test Example 2

Water Permeability Test

Water permeability of the filter media in Examples 9 to 11 and Comparative Examples 3 to 4 was measured at 20 kPa transmembrane pressure difference per 1 minute and 1 cm² assuming actual wastewater filtration.

In addition, each filter medium was soaked in a 0.6 mass % sodium hypochlorite aqueous solution for 2 weeks, and then washed with water and dried at room temperature overnight. Subsequently, water permeability of each filter medium was measured under the same conditions as the above-mentioned conditions. In addition, a decreasing rate of water permeability of each filter medium was calculated. The results are shown in Table 2.

TABLE 2

| | | Water Permeability (mL/min/cm²) | | |
|---|---|---|---|---|
| | | Before NaClO treatment | After NaClO treatment | Decreasing rate of water permeability |
| Example 9 | Treatment of 0.1% BL5335 with cross-linked PVA of coating layer | 5.35 | 3.58 | 33 |
| Example 10 | Treatment of 0.5% BL5335 with cross-linked PVA of coating layer | 5.02 | 3.64 | 27 |
| Example 11 | Treatment of 0.15% MEIKANATE with cross-linked PVA of coating layer | 6.60 | 3.08 | 53 |
| Comparative Example 3 | Direct cross-link of 5% MEIKANATE with PVA of coating layer | 0.28 | unmeasurable | 100 |
| Comparative Example 4 | Direct cross-link of 10% MEIKANATE with PVA of coating layer | 0.34 | unmeasurable | 100 |

As shown in the results, in the case where polyvinyl alcohol of the coating layer was directly cross-linked with a diisocyanate compound, water permeability before the sodium hypochlorite treatment was low but the reason was not exactly obvious. In addition, water permeability was decreased below the limit of measurement after the filter media were treated with the sodium hypochlorite aqueous solution. The cause is thought to be that the cross-linked chain of the coating layer was cut by the attack of sodium hypochlorite, and the coating layer was dropped so that the hydrophilicity of the filter media was decreased.

On the other hand, in the case where polyvinyl alcohol of the coating layer was cross-linked and the high electron density part having a π electron was bound thereto, water permeability before the sodium hypochlorite treatment was high and water permeability was sufficiently maintained even after contacting sodium hypochlorite for two weeks. By the above experiment, it was demonstrated that the filter media for a water treatment filter according to the present invention had excellent water permeability and high resistance against the oxidizing agent.

Test Example 3

Mass Change Test

To verify the consideration of the above Test Example 2, each filter medium was tested for mass change. Specifically, each filter-medium in Examples 9 to 11 and Comparative Examples 3 to 4 was weighed. Then, each filter medium was soaked in a sodium hypochlorite aqueous solution for two weeks in the same manner as Test Example 2, and each filter medium was weighed. The results are shown in Table 3.

TABLE 3

| | | Mass (g) | | |
|---|---|---|---|---|
| | | Before NaClO treatment | After NaClO treatment | Mass change rate |
| Example 9 | Treatment of 0.1% BL5335 with cross-linked PVA of coating layer | 0.137 | 0.137 | 0% |
| Example 10 | Treatment of 0.5% BL5335 with cross-linked PVA of coating layer | 0.138 | 0.138 | 0% |
| Example 11 | Treatment of 0.15% MEIKANATE with cross-linked PVA of coating layer | 0.145 | 0.145 | 0% |
| Comparative Example 3 | Direct cross-link of 5% MEIKANATE with PVA of coating layer | 0.158 | 0.155 | 1.90% |
| Comparative Example 4 | Direct cross-link of 10% MEIKANATE with PVA of coating layer | 0.142 | 0.139 | 2.11% |

As shown in the results, in the case where polyvinyl alcohol of the coating layer was directly cross-linked with a diisocyanate compound, the decrease of mass was clearly confirmed after the treatment with sodium hypochlorite. On the other hand, the decrease of mass in the filter media for a water treatment filter according to the present invention was not clearly confirmed even after the treatment with sodium hypochlorite. By the above results, it was verified that the filter media for a water treatment filter according to the present invention had excellent water permeability and high resistance against the oxidizing agent.

The invention claimed is:
1. A filter medium for a water treatment filter, comprising
   a) porous base material, wherein the porous base material has no π electrons; and
   b) a hydrophilic coating layer, wherein the porous base material is coated with the hydrophilic coating layer; and wherein the hydrophilic coating layer comprises
      1) a cross-linked hydrophilic polymer comprising:
         i) hydrophilic polymer having a main chain, wherein the main chain of the hydrophilic polymer has no π electrons; and
         ii) a cross-linked chain formed by cross-linking the hydrophilic polymer with an aliphatic saturated hydrocarbon group containing one or more functional groups selected from a group consisting of an ether group, a hydroxy group and an amino group, and wherein the cross-linked chain has no π electrons; and

2) a high electron density part having π electrons; and the high electron density part is covalently bonded to the cross-linked hydrophilic polymer.

2. The filter medium for a water treatment filter according to claim 1, wherein the high electron density part has one or more selected from a group consisting of an aliphatic unsaturated hydrocarbon group, an aromatic hydrocarbon group, a heteroaromatic hydrocarbon group, a carbonyl group, a nitrile group, a sulfoxide bond, a sulfonyl bond and a sulfonic group.

3. The filter medium for a water treatment filter according to claim 1, wherein the high electron density part has an amide bond.

4. The filter medium for a water treatment filter according to claim 1, wherein the high electron density part has an aromatic hydrocarbon group.

5. The filter medium for a water treatment filter according to claim 1, wherein the high electron density part further has a hydrophilic group.

6. The filter medium for a water treatment filter according to claim 5, wherein the hydrophilic group is one or more selected from a group consisting of a hydroxy group, a sulfonic group, a carboxy group and an amino group.

7. The filter medium for a water treatment filter according to claim 1, wherein the porous base material is a porous fluororesin membrane.

8. The filter medium for a water treatment filter according to claim 7, wherein the porous fluororesin membrane is a porous PTFE membrane.

9. The filter medium for a water treatment filter according to claim 1, wherein the hydrophilic polymer is polyvinyl alcohol, ethylene-vinylalcohol copolymer, tetrafluoroethylene-vinylalcohol copolymer, polyalkylene glycol or a metal alkoxide.

10. A water treatment filter, comprising a filter medium for a water treatment filter according to claim 1.

11. The water treatment filter according to claim 10, wherein water permeability at 20 kPa transmembrane pressure difference is 1 mL/min/cm$^2$ or more.

12. The water treatment filter according to claim 11, wherein a decreasing rate of water permeability is 70% or less after soaking in a 0.6 mass % sodium hypochlorite aqueous solution for two weeks.

13. A water treatment apparatus, comprising a water treatment filter according to claim 10.

14. A method for producing the filter medium for a water treatment filter according to claim 1, comprising the steps of
soaking the porous base material in a hydrophilic polymer solution and a cross-linking agent solution,
cross-linking the hydrophilic polymer with the aliphatic saturated hydrocarbon group containing one or more functional groups selected from a group consisting of an ether group, a hydroxy group and an amino group, and
reacting the cross-linked hydrophilic polymer with a precursor compound of the high electron density part having a π electron, to covalently bond the high electron density part to the cross-linked hydrophilic polymer.

15. A method for improving oxidation resistance property of a filter medium for a water treatment filter, comprising the steps of
1) providing a porous base material having a hydrophilic coating layer,
a) wherein the porous base material has no π electrons, and
b) wherein the hydrophilic coating layer comprises a cross-linked hydrophilic polymer comprising:
i) hydrophilic polymer having a main chain, wherein the main chain of the hydrophilic polymer has no π electrons; and
ii) a cross-linked chain formed by cross-linking the hydrophilic polymer with an aliphatic saturated hydrocarbon group containing one or more functional groups selected from a group consisting of an ether group, a hydroxy group and an amino group, and wherein the cross-linked chain has no π electrons; and
2) covalently bonding a high electron density part having a π electron to the hydrophilic coating layer on the porous base material, thereby improving the oxidation resistance property against an oxidizing agent used for washing the water treatment filter.

* * * * *